(12) United States Patent
Sonnier et al.

(10) Patent No.: US 10,591,086 B2
(45) Date of Patent: Mar. 17, 2020

(54) FLUID THROTTLING VALVE

(71) Applicant: AGI INDUSTRIES, INC., Lafayette, LA (US)

(72) Inventors: Bryan T. Sonnier, Lafayette, LA (US); Christopher F. Rooney, Gordonville, TX (US)

(73) Assignee: AGI INDUSTRIES, INC., Lafayette, LA (US)

( * ) Notice: Subject to any disclaimer, the term of this patent is extended or adjusted under 35 U.S.C. 154(b) by 0 days.

(21) Appl. No.: 16/135,143

(22) Filed: Sep. 19, 2018

(65) Prior Publication Data

US 2019/0040975 A1    Feb. 7, 2019

Related U.S. Application Data

(62) Division of application No. 15/839,796, filed on Dec. 12, 2017, now Pat. No. 10,344,891.

(60) Provisional application No. 62/433,123, filed on Dec. 12, 2016.

(51) Int. Cl.
| | |
|---|---|
| *F16K 47/08* | (2006.01) |
| *F16K 3/32* | (2006.01) |
| *F16K 3/24* | (2006.01) |
| *F16K 5/04* | (2006.01) |
| *F16K 3/08* | (2006.01) |
| *F16K 27/04* | (2006.01) |
| *F16K 47/04* | (2006.01) |

(52) U.S. Cl.
CPC .............. *F16K 47/08* (2013.01); *F16K 3/085* (2013.01); *F16K 3/24* (2013.01); *F16K 3/32* (2013.01); *F16K 5/0414* (2013.01); *F16K 27/045* (2013.01); *F16K 47/045* (2013.01); *Y10T 137/86743* (2015.04)

(58) Field of Classification Search
CPC ........ F16K 47/08; F16K 27/045; F16K 3/085; F16K 5/0414; F16K 3/24; F16K 3/32; F16K 47/045; Y10T 137/86743
USPC ............. 137/625.31; 251/208–209, 366–367
See application file for complete search history.

(56) References Cited

U.S. PATENT DOCUMENTS

| | | | | |
|---|---|---|---|---|
| 3,426,797 A | * | 2/1969 | Baker | F16K 3/085 137/625.31 |
| 4,360,040 A | * | 11/1982 | Cove | F16K 3/34 137/625.3 |
| 4,395,019 A | * | 7/1983 | Searles | F16K 3/085 137/329.01 |
| 4,516,606 A | * | 5/1985 | Worley | F15D 1/0005 137/625.3 |
| 4,532,961 A | * | 8/1985 | Walton | F16K 3/085 137/625.31 |
| 4,549,579 A | * | 10/1985 | Bergmann | F16K 3/085 137/625.21 |

(Continued)

*Primary Examiner* — John Bastianelli
(74) *Attorney, Agent, or Firm* — Ted M. Anthony

(57) ABSTRACT

A throttling valve that allows an operator to remove and replace the flow trim of the throttling valve without disassembling and/or removing the throttling valve from a flow line, and without removing an actuator, which eliminates the need to recalibrate said actuator. The throttling valve also allows drops in fluid pressure to be staged upstream and/or downstream of a main multi-port-disc trim within the same valve body to help prevent cavitation and freezing of fluids contained within the valve. The throttling valve also allows direct connection of actuators to a valve body.

11 Claims, 9 Drawing Sheets

(56) References Cited

U.S. PATENT DOCUMENTS

| | | | | |
|---|---|---|---|---|
| 5,025,832 A | * | 6/1991 | Taylor | F16K 3/085 |
| | | | | 137/625.31 |
| 5,054,521 A | * | 10/1991 | Hendrick | F16K 3/085 |
| | | | | 137/625.3 |
| 5,080,128 A | * | 1/1992 | Taylor | F16K 3/08 |
| | | | | 137/316 |
| 5,402,821 A | * | 4/1995 | Harstad | F16K 3/085 |
| | | | | 137/556 |
| 7,726,338 B2 | * | 6/2010 | Clasen | F16K 3/085 |
| | | | | 137/625.31 |

* cited by examiner

FLUID THROTTLING VALVE

BACKGROUND OF THE INVENTION

Field of the Invention

The subject invention relates to throttling valves used to control the pressure and flow rate of a fluid flowing through a flow line.

Description of Related Art

A throttling valve, or choke valve, which can also be known as a control valve, is a device that is used to restrict the flow rate and/or reduce the pressure of a fluid flowing in a flow line. A throttling valve typically has a means for varying the amount of restriction imposed on the fluid flowing through the flow line.

In general, throttling valves consist of the following parts:
(1) a valve body having an axial bore, an inlet, and an outlet;
(2) a "flow trim" mounted in the axial bore between the inlet and the outlet, for controlling the rate of flow of the fluid through the valve body; and
(3) an actuator for manipulating the flow trim.

There are four main types of flow trim commonly used in commercial throttling valves. These four types of flow trim can be characterized as follows:
(1) a needle-and-seat flow trim, comprising a tapered annular seat fixed in the valve body, and a movable tapered internal plug for controlling the rate of flow of the fluid through the throttling valve and for sealing the seat surface;
(2) a cage-with-internal-plug flow trim, comprising a tubular, cylindrical cage, fixed in the valve body and having ports in its side wall, and a plug movable axially through the bore of the cage to open or close the ports. Shut-off is generally accomplished with a taper on the leading edge of the plug, which seats on a taper carried by the cage or body downstream of the ports;
(3) a multiple-port-disc flow trim, having a fixed, ported disc mounted in the valve body and a contiguous, rotatable ported disc that can be turned to cause the two sets of ports to move into or out of alignment, for throttling and shut-off; and
(4) a cage-with-external-sleeve flow trim, comprising a tubular cylindrical cage having ports in its side wall and a hollow cylindrical sleeve that slides axially over the cage to open and close the ports. The shut-off is accomplished with the leading edge of the sleeve contacting an annular seat carried by the valve body or cage.

Ideally, all valves, including throttling valves, should have long life spans and should be easy to maintain. Valve failures can be dangerous, environmentally undesirable, and costly. However, the requirements for throttling valves can be severe due to erosion and/or corrosion of the inner surface of the valve body and the inner valve parts just before, at, and just downstream of the point of throttling. The erosion and corrosion is a combination of several conditions, which are particularly prevalent in the oil and gas industry. Fluids in the oil and gas industry frequently contain sand-like mineral particles, brine, and acid gases. The erosive and corrosive characteristics of petroleum fluids in throttling valves is aggravated by the effects of increased fluid turbulence, impingement on metal surfaces, and fluid cavitational phenomena.

Throttling valve designers have tried without total success to eliminate erosion and corrosion. It has become common practice to use erosion and corrosion resistant pistons, sleeves, cages, tapered stem tips, and valve seats made of or plated or lined with tungsten carbide, chrome stainless, stellite, and ceramics. It has also become common practice to line the valve body inlet, chamber, and outlet with such erosion and corrosion resistant materials. Despite these preventive measures, valve seats and members still continue to erode and corrode, thereby altering the control characteristics and abilities of the valve, and frequently rendering the valve unreliable. In addition, valve bodies still continue to fail.

Additionally, conventional throttling valves frequently suffer from a phenomenon known as Joule-Thomson effect, which is also sometimes referred to as the "JT effect." In accordance with the JT effect, temperature of a fluid, such as a real gas or liquid, can change significantly when such fluid passes through a throttling valve; notably, the temperature of the fluid can drop drastically when said fluid experiences a rapid pressure drop. Although the JT effect can occur in any valve in which fluid pressure drop occurs, the JT effect is especially common during the throttling process in throttling valves. The JT effect can cause fluids to freeze (such as, for example, liquids entrained in a gas stream) or hydrates to form which, in turn, can cause valve openings to become restricted or closed off entirely. This can lead to downtime and/or require costly or time consuming remedial operations.

Actuation of valves can be accomplished through manual handles or automatic actuators. In order to use an actuator, a bracket and socket style linkage is used to connect the rotation of the actuator to the valve stem. The addition of these pieces adds cost, complexity, size, and hysteresis.

The present invention comprises a throttling valve that addresses erosion, corrosion, and freezing problems encountered by throttling valves including, without limitation, those caused by the JT effect. The throttling valve of the present invention allows an operator to remove and replace a flow trim of said throttling valve without disassembling and/or removing the throttling valve connections from a flow line, and without removing an actuator from the valve body, which eliminates the need for recalibrating the actuator.

The throttling valve of the present invention also permits the installation/placement of additional orifices upstream and downstream of a main controlling multi-port-disc trim within the same valve body. This capability permits fluid pressure throttling to occur in multiple smaller drops or "stages" in order to reduce or eliminate cavitation, as well as temperature loss due to the JT effect.

The present invention utilizes a specially designed stem and actuator mounting pad on the 90-degree and Y-shaped configurations to allow for direct connection of actuators to the valve body eliminating the need for bracket and socket linkages as well as the resulting cost, complexity, size, and hysteresis.

DESCRIPTION OF THE INVENTION

Figure 1:
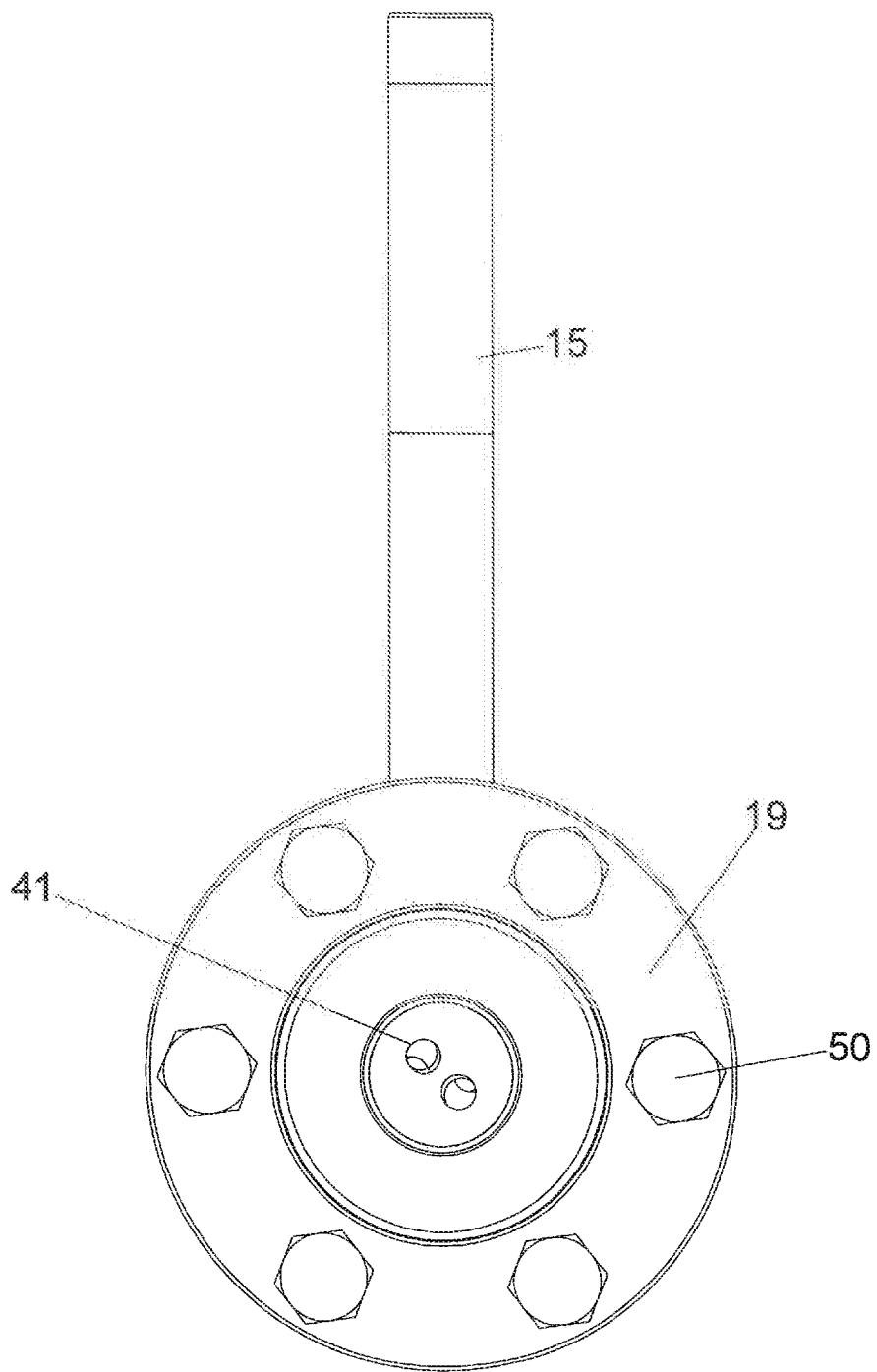
FIG. 1 is a side view of the inline configuration of the fluid throttling valve.

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

As shown in FIGS. 1 through 9, the fluid throttling valve 10 preferably has three configurations: (1) the inline configuration 11 (shown in FIGS. 1 through 3); (2) the 90-degree configuration 12 (shown in FIGS. 4 through 6); and the Y configuration 13 (shown in FIGS. 7 through 9). All three preferred configurations include some of the same basic components, such as a valve body 14, a valve handle 15, a rotating orifice disk 16, a fixed orifice disk 17, a valve hub 18, a valve hub retainer 19, and a valve hub split collar 20

Figure 2:
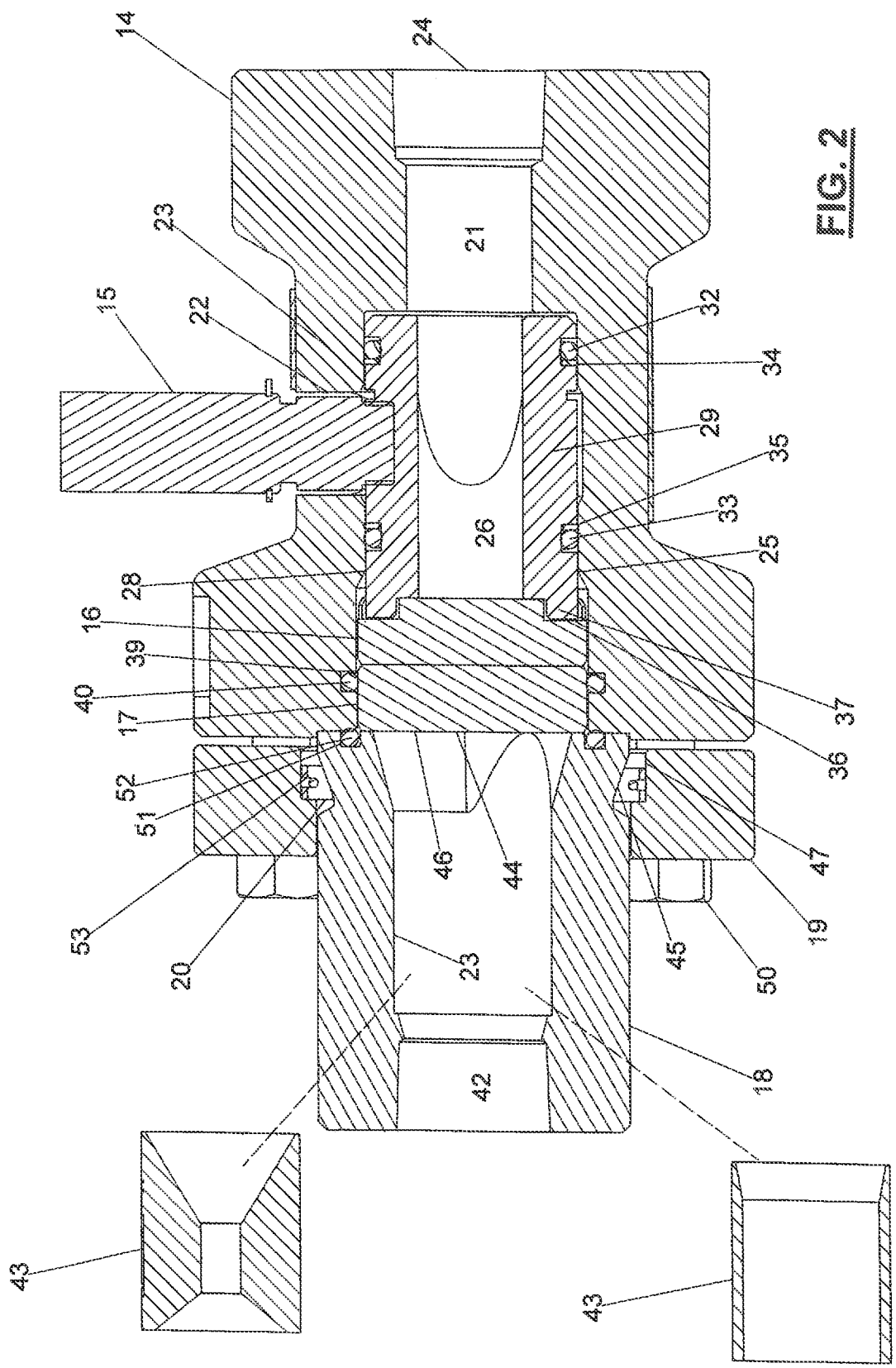
FIG. 2 is a sectional view of the inline configuration of the fluid throttling valve of FIG. 1 taken through line A-A.
Figure 3:
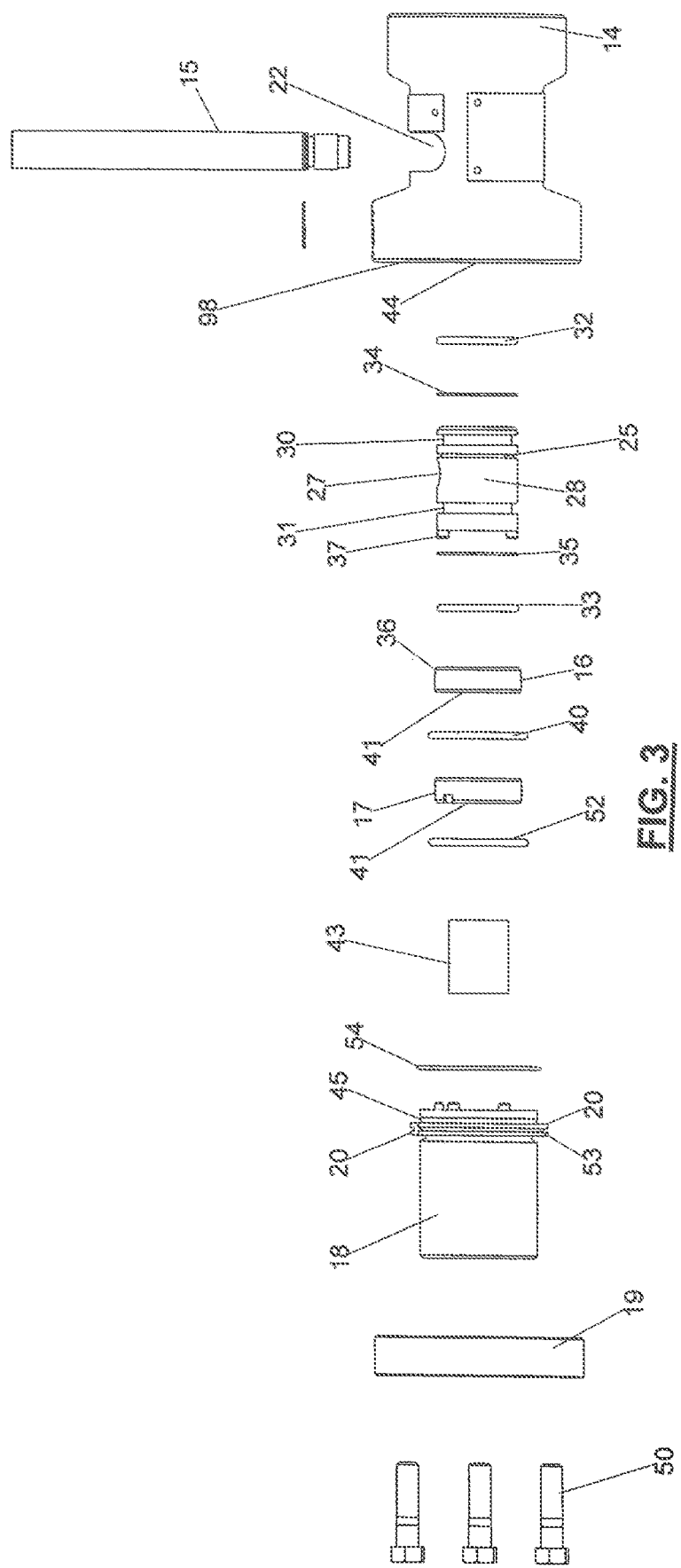
FIG. 3 is an exploded view of the inline configuration of the fluid throttling valve.
Figure 4:
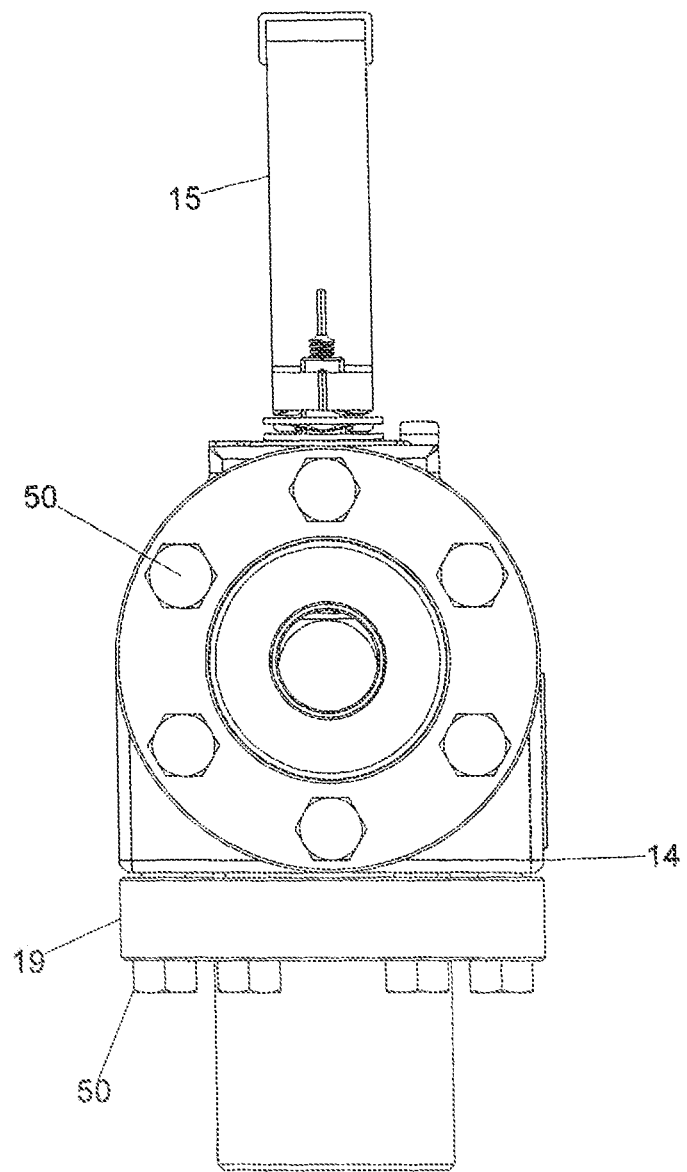
FIG. 4 is a side view of the 90-degree configuration of the fluid throttling valve.

As shown in FIGS. 1 through 3, inline configuration 11 of fluid throttling valve 10 includes a valve body 14, which is generally cylindrical in shape. Valve body 14 has an axial bore 21 extending from the inlet 24 to the outlet 44 of valve body 14. Valve body 14 also has a circumferential slot 22 extending through the wall 23 of valve body 14, but the circumferential slot 22 extends through wall 23 for only a portion of the circumference of wall 23 of valve body 14, as shown in FIG. 3. Inlet 24 of valve body 14 may have various configurations extending into axial bore 21 to provide an appropriate interface for connecting valve body 14 to various types of flow lines. Valve body 14 preferably has threaded bolt holes 98 for receiving the threaded ends of bolts 50, as discussed in more detail below.

As shown in FIGS. 2 and 3, inline configuration 11 of fluid throttling valve 10 includes valve rotator 25, which is preferably cylindrical in shape. Valve rotator 25 is designed to fit into a portion of axial bore 21 of valve body 14, as shown in FIG. 2. Valve rotator 25 has an axial bore 26 extending through valve rotator 25 to allow passage of fluid flowing through fluid throttling valve 10. Valve rotator 25 also has a hole 27 extending from the outer surface 28 through a portion of the wall 29 of valve rotator 25. Hole 27 may be threaded for connecting valve handle 15, as discussed in more detail below. Valve rotator 25 should be positioned within axial bore 21 of valve body 14 so that hole 27 is aligned with circumferential slot 22 in wall 23 of valve body 14.

Valve rotator 25 has a circumferential o-ring groove 30 on the outer surface 28 of wall 29 of valve rotator 25 on the upstream side of hole 27. O-ring 32 fits into o-ring groove 30 to form a fluid-tight seal between wall 29 of valve rotator 25 and wall 23 of valve body 14 on the upstream side of hole 27. Back-up ring 34 also fits into o-ring groove 30 adjacent to and downstream of o-ring 32 as a secondary seal between wall 29 of valve rotator 25 and wall 23 of valve body 14 on the upstream side of hole 27. Back-up ring 34 helps energize the primary seal of o-ring 32 between wall 29 of valve rotator 25 and wall 23 of valve body 14 on the upstream side of hole 27.

Valve rotator 25 also has a circumferential o-ring groove 31 on the outer surface 28 of wall 29 of valve rotator 25 on the downstream side of hole 27. O-ring 33 fits into o-ring groove 31 to form a fluid-tight seal between wall 29 of valve rotator 25 and wall 23 of valve body 14 on the downstream side of hole 27. Back-up ring 35 also fits into o-ring groove 31 adjacent to and upstream of o-ring 33 as a secondary seal between wall 29 of valve rotator 25 and wall 23 of valve body 14 on the downstream side of hole 27. Back-up ring 35 helps energize the primary seal of o-ring 33 between wall 29 of valve rotator 25 and wall 23 of valve body 14 on the downstream side of hole 27.

As shown in FIGS. 2 and 3, inline configuration 11 of fluid throttling valve 10 includes rotating orifice disk 16, which is designed to fit within axial bore 21 of valve body 14 downstream of valve rotator 25. Valve rotator 25 has tabs 37 for engaging corresponding slots 36 on rotating orifice disk 16. When tabs 37 are engaged with slots 36, rotating orifice disk 16 rotates within axial bore 21 of valve body 14 when valve rotator 25 is rotated. Rotating orifice disk 16 also has at least one axial orifice extending through rotating orifice disk 16, which allows passage of fluid flowing through fluid throttling valve 10, but also restricts the passage of fluid flowing through fluid throttling valve 10, which results in a reduction of flow rate and/or a decrease in pressure of the fluid flowing through fluid throttling valve 10. At least one orifice can vary in size and shape depending on the amount of flow restriction or pressure drop is desired through fluid throttling valve 10.

As shown in FIGS. 2 and 3, inline configuration 11 of fluid throttling valve 10 includes fixed orifice disk 17, which is designed to fit within axial bore 21 of valve body 14 downstream of rotating orifice disk 16. Unlike rotating orifice disk 16, fixed orifice disk 17 is not designed to rotate within axial bore 21 of valve body 14. Fixed orifice disk 17 is positioned within axial bore 21 of valve body 14 where axial bore 21 has a circumferential o-ring groove 39. O-ring 40 fits into o-ring groove 39 to form a fluid-tight seal between axial bore 21 of valve body 14 and fixed orifice disk 17.

Like rotating orifice disk 16, fixed orifice disk 17 has at least one axial orifice extending through fixed orifice disk 17, which allows passage of fluid flowing through fluid throttling valve 10, but also restricts the passage of fluid flowing through fluid throttling valve 10, which results in a reduction of flow rate and/or a decrease in pressure of the fluid flowing through fluid throttling valve 10. At least one orifice 41 can vary in size and shape depending on the amount of flow restriction and/or pressure drop is desired through fluid throttling valve 10. The amount of flow restriction and/or pressure drop through fluid throttling valve 10 can be controlled by rotating orifice disk 16, which changes the alignment of the orifices in rotating orifice disk 16 and fixed orifice disk 17, respectively. Maximum flow rate and minimum pressure drop results when the orifices in rotating orifice disk 16 and fixed orifice disk 17 are aligned. The flow rate is restricted and/or the pressure drop is increased as the orifices in rotating orifice disk 16 and fixed orifice disk 17 become less aligned. The flow rate is stopped and the pressure drop is complete when the orifices in rotating orifice disk 16 and fixed orifice disk 17 are misaligned to prevent any passage of fluid through fluid throttling valve 10.

As shown in FIGS. 2 and 3, inline configuration 11 of fluid throttling valve 10 includes a valve hub 18 that is preferably cylindrical in shape with an axial bore 42. Valve hub 18 is positioned next to outlet 44 of valve body 14 downstream from fixed orifice disk 17. Valve hub 18 serves the purpose of connecting fluid throttling valve 10 to various types of flow lines downstream of fluid throttling valve 10. Valve hub 18 can be operated with or without a hub wear sleeve 43, which is also cylindrical in shape with an axial bore, and which snuggly fits inside axial bore 42 of valve hub 18 to protect the inner wall 23 of axial bore 42 from excessive wear due to cavitation.

As shown in FIGS. 2 and 3, valve hub 18 is preferably equipped with an outer circumferential angle wedge 45 near its upstream end 46. Angle wedge 45 is designed to receive split collar 20 for securing valve hub 18 next to outlet 44 of valve body 14.

Valve hub 18 is held in place next to outlet 44 of valve body 14 with a valve hub retainer 19. As shown in FIG. 2, valve hub retainer 19 has an inner circumferential recessed area 47. After valve hub 18 is placed into position next to outlet 44 of valve body 14, valve hub retainer 19 is slipped over valve hub 18 and positioned next to outlet 44 of valve body 14 so that the bolt holes in valve hub retainer 19 are aligned with the threaded bolt holes on valve body 14. Bolts 50 are then used to secure valve hub retainer 19 to valve body 14. As bolts 50 are tightened, recessed area 47 on valve hub retainer 19 applies pressure to split collar 20 to hold valve hub 18 in place next to outlet 44 of valve body 14.

Valve hub 18 is preferably equipped with an o-ring groove 51 and an o-ring 52 on upstream end 46 of valve hub 18 to provide a seal between valve hub 18 and valve body 14. Likewise, split collar 20 is preferably equipped with an outer circumferential o-ring groove 53 and an o-ring to retain split collar 20 against wedge 45 of valve hub 18 during disassembly.

Figure 5:
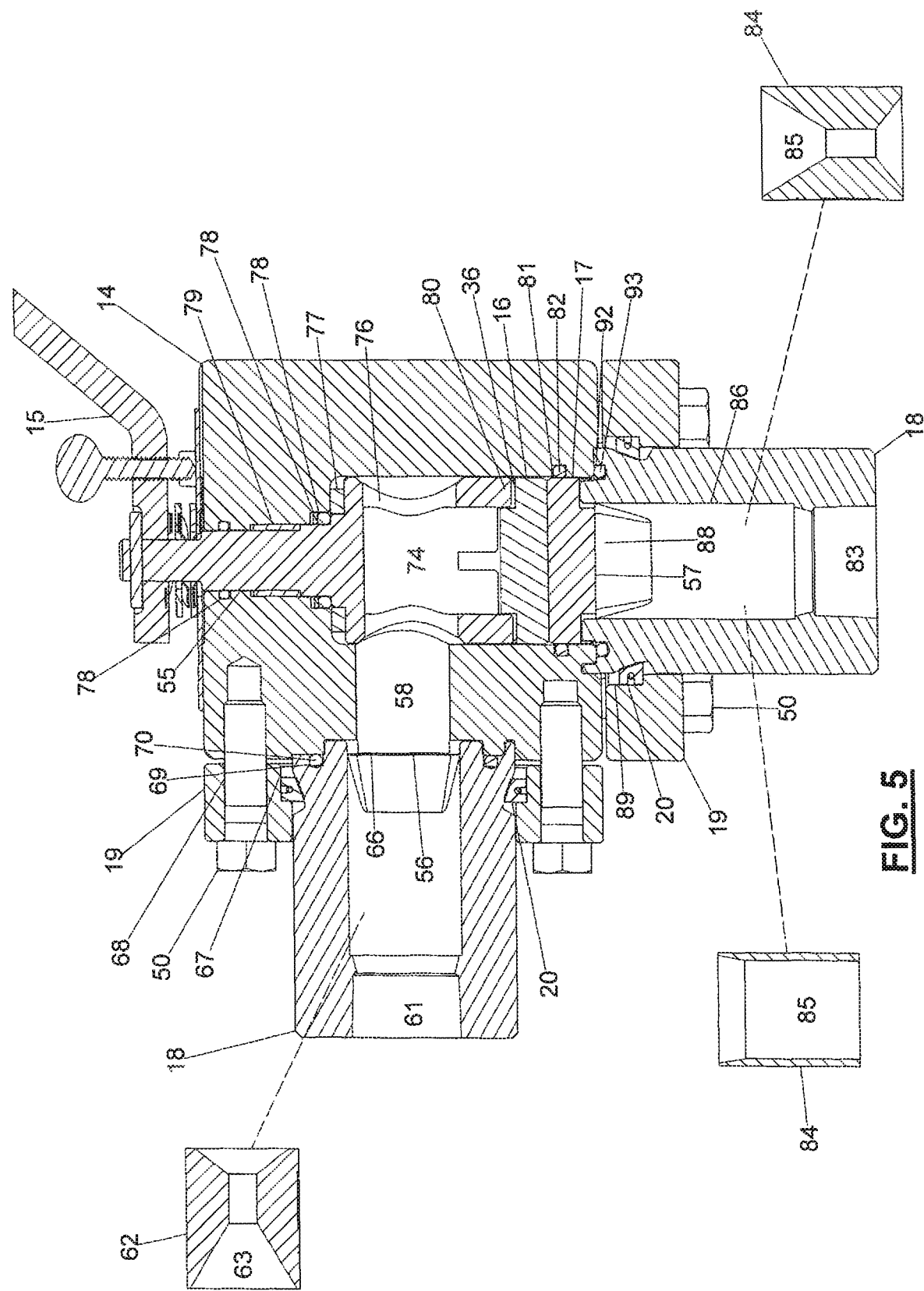
FIG. 5 is a sectional view of the 90-degree configuration of the fluid throttling valve of FIG. 4 taken through line A-A.
Figure 6:
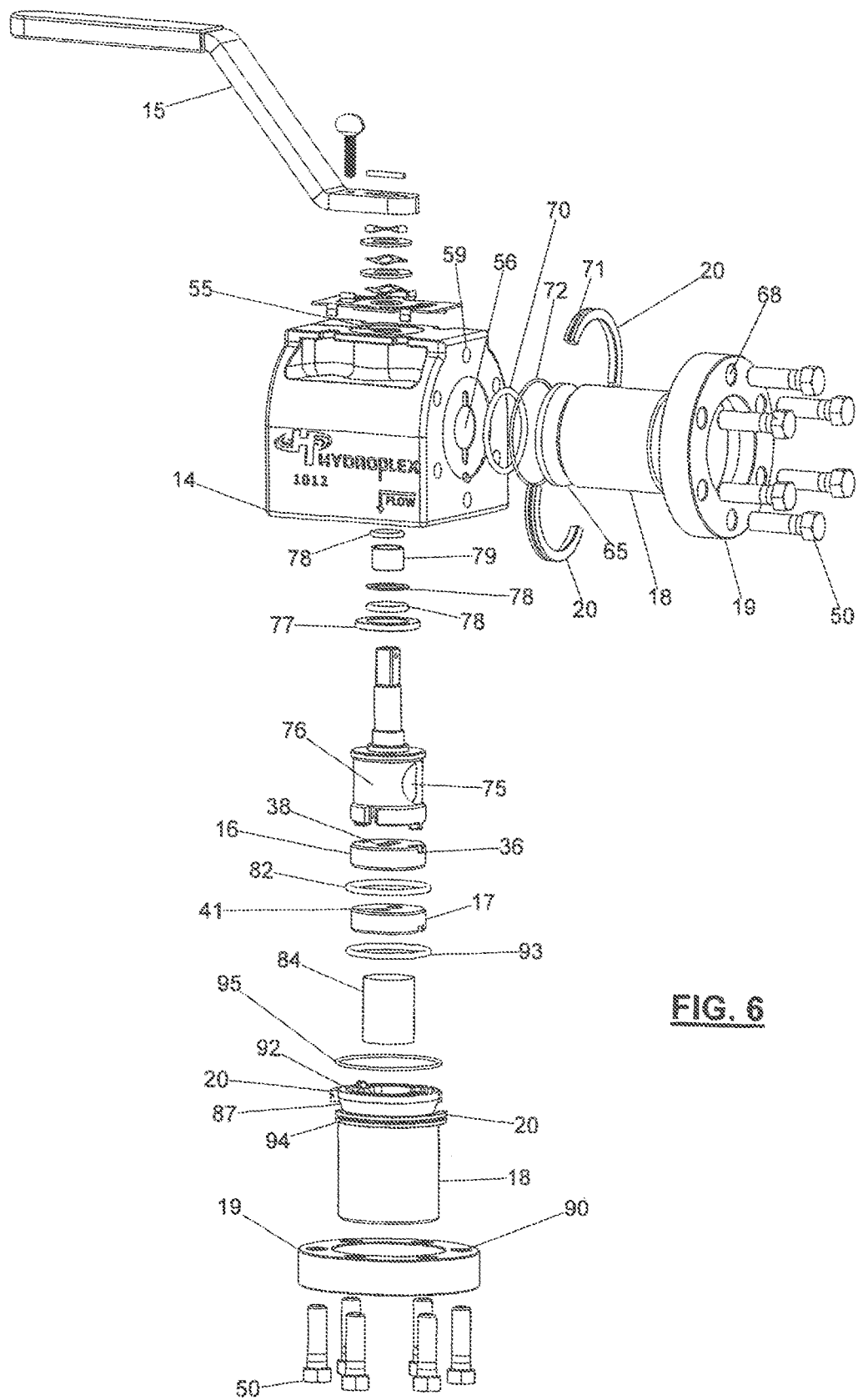
FIG. 6 is an exploded view of the 90-degree configuration of the fluid throttling valve.

As shown in FIGS. 4 through 6, 90-degree configuration 12 of fluid throttling valve 10 includes a valve body 14, which has a valve stem opening 55, an inlet 56, an outlet 57, and an inner chamber 58 that makes a 90-degree turn to connect inlet 56 to outlet 57. Inner chamber 58 forms a generally L-shaped bore network between inlet 56 and outlet 57. Valve body 14 preferably has threaded bolt holes 59 at inlet 56 for receiving the threaded ends of bolts 50. Valve body 14 also preferably has threaded bolt holes at outlet 57 for receiving the threaded ends of bolts 50. As shown in FIGS. 5 and 6, 90-degree configuration 12 of fluid throttling valve 10 includes a valve hub 18 that is preferably cylindrical in shape with an axial bore 61. Valve hub 18 is positioned next to and upstream of inlet 56 of valve body 14. Valve hub 18 serves the purpose of connecting fluid throttling valve 10 to various types of flow lines upstream of fluid throttling valve 10. Valve hub 18 can be operated with or without a flow constrictor 62, which is also cylindrical in shape with an axial bore 63, and which snuggly fits inside axial bore 61 of valve hub 18. Flow constrictor 62 provides a means for decreasing the rate of flow or the pressure of fluids entering 90-degree configuration 12 of fluid throttling valve 10.

As shown in FIGS. 5 and 6, valve hub 18 is preferably equipped with an outer circumferential angle wedge 65 near its downstream end 66. Angle wedge 65 is designed to receive split collar 20 for securing valve hub 18 next to inlet 56 of valve body 14.

Valve hub 18 of 90-degree configuration 12 of fluid throttling valve 10 is held in place next to inlet 56 of valve body 14 with a valve hub retainer 19. As shown in FIG. 5, valve hub retainer 19 has an inner circumferential recessed area 67. Valve hub retainer 19 also has bolt holes 68. After valve hub 18 is placed into position next to inlet 56 of valve body 14, valve hub retainer 19 is slipped over valve hub 18 and positioned next to inlet 56 of valve body 14 so that bolt holes 68 in valve hub retainer 19 are aligned with threaded bolt holes 59 on valve body 14. Bolts 50 are then used to secure valve hub retainer 19 to valve body 14. As bolts 50 are tightened, recessed area 67 on valve hub retainer 19 applies pressure to split collar 20 to hold valve hub 18 in place next to inlet 56 of valve body 14.

Valve hub 18 is preferably equipped with an o-ring groove 69 and an o-ring 70 on downstream end 66 of valve hub 18 to provide a seal between valve hub 18 and valve body 14. Likewise, split collar 20 is preferably equipped with an outer circumferential o-ring groove 71 and an o-ring 72 to retain split collar 20 against wedge 65 of valve hub 18 during disassembly.

As shown in FIGS. 5 and 6, 90-degree configuration 12 of fluid throttling valve 10 includes valve stem 73, which is preferably cylindrical in shape. Valve stem 73 is designed to extend through valve stem opening 55 of valve body 14, as shown in FIG. 5. Valve stem 73 has an axial bore 74 extending through a portion of valve stem 73 to allow passage of fluid flowing through fluid throttling valve 10. Valve stem 73 also has a hole 75 extending all the way through wall 76 of valve stem 73. Valve stem 73 should be positioned within valve body 14 so that hole 75 can be aligned with inlet 56 valve body 14.

As shown in FIG. 5, valve stem 73 extends through valve stem opening 55 and connected to a valve handle 15. A thrust bearing 77 can be used to reduce friction between valve stem 73 and valve body 14. O-rings 78 and a backup ring are preferably used to prevent fluids from leaking from inner chamber 58 through valve stem opening 55. Stem bushing 79 is preferably used to centralize valve stem 73 within valve stem opening 55 and to protect against side load wear on valve stem 73.

As shown in FIGS. 5 and 6, 90-degree configuration 12 of fluid throttling valve 10 includes rotating orifice disk 16, which is designed to fit within inner chamber 58 of valve body 14 downstream of valve stem 73. Valve stem 73 has tabs 80 for engaging corresponding slots 36 on rotating orifice disk 16. When tabs 80 are engaged with slots 36, rotating orifice disk 16 rotates within inner chamber 58 when valve stem 73 is rotated. Rotating orifice disk 16 also has at least one axial orifice 38 extending through rotating orifice disk 16, which allows passage of fluid flowing through fluid throttling valve 10, but also restricts the passage of fluid flowing through fluid throttling valve 10, which results in a reduction of flow rate and/or a decrease in pressure of the fluid flowing through fluid throttling valve 10. At least one orifice 38 can vary in size and shape depending on the amount of flow restriction or pressure drop desired through fluid throttling valve 10.

As shown in FIGS. 5 and 6, 90-degree configuration 12 of fluid throttling valve 10 includes fixed orifice disk 17, which is designed to fit within inner chamber 58 of valve body 14 downstream of rotating orifice disk 16. Unlike rotating orifice disk 16, fixed orifice disk 17 is not designed to rotate within inner chamber 58 of valve body 14. Fixed orifice disk 17 is positioned within inner chamber 58 of valve body 14 where inner chamber 58 has a circumferential o-ring groove 81. O-ring 82 fits into o-ring groove 81 to form a fluid-tight seal between inner chamber 58 of valve body 14 and fixed orifice disk 17.

Like rotating orifice disk 16, fixed orifice disk 17 has at least one axial orifice 41 extending through fixed orifice disk 17, which allows passage of fluid flowing through fluid throttling valve 10, but also restricts the passage of fluid flowing through fluid throttling valve 10, which results in a reduction of flow rate and/or a decrease in pressure of the fluid flowing through fluid throttling valve 10. At least one orifice 41 can vary in size and shape depending on the amount of flow restriction and/or pressure drop is desired through fluid throttling valve 10. The amount of flow restriction and/or pressure drop through fluid throttling valve 10 can be controlled by rotating orifice disk 16, which changes the alignment of the orifices 38 and 41 in rotating orifice disk 16 and fixed orifice disk 17, respectively. Maximum flow rate and minimum pressure drop results when orifices 38 and 41 are aligned. The flow rate is restricted and/or the pressure drop is increased as orifices 38 and 41 become less aligned. The flow rate is stopped and the pressure drop is complete when orifices 38 and 41 are misaligned to prevent any passage of fluid through fluid throttling valve 10.

As shown in FIGS. 5 and 6, 90-degree configuration 12 of fluid throttling valve 10 includes a valve hub 18 that is preferably cylindrical in shape with an axial bore 83. Valve hub 18 is positioned next to outlet 57 of valve body 14 downstream from fixed orifice disk 17. Valve hub 18 serves the purpose of connecting fluid throttling valve 10 to various types of flow lines downstream of fluid throttling valve 10. Valve hub 18 can be operated with or without a hub wear sleeve 84, which is also cylindrical in shape with an axial bore 85, and which snuggly fits inside axial bore 83 of valve hub 18 to protect the inner wall 86 of axial bore 83 from excessive wear due to cavitation.

As shown in FIG. 5, valve hub 18 is preferably equipped with an outer circumferential angle wedge 87 near its upstream end 88. Angle wedge 87 is designed to receive split collar 20 for securing valve hub 18 next to outlet 57 of valve body 14.

Valve hub 18 is held in place next to outlet 57 of valve body 14 with a valve hub retainer 19. As shown in FIG. 5, valve hub retainer 19 has an inner circumferential recessed area 89. Valve hub retainer 19 also has bolt holes 90. After valve hub 18 is placed into position next to outlet 57 of valve body 14, valve hub retainer 19 is slipped over valve hub 18 and positioned next to outlet 57 of valve body 14 so that bolt holes 90 in valve hub retainer 19 are aligned with the threaded bolt holes on valve body 14. Bolts 50 are then used to secure valve hub retainer 19 to valve body 14. As bolts 50 are tightened, recessed area 89 on valve hub retainer 19 applies pressure to split collar 20 to hold valve hub 18 in place next to outlet 57 of valve body 14.

Valve hub 18 is preferably equipped with an o-ring groove 92 and an o-ring 93 on upstream end 88 of valve hub 18 to provide a seal between valve hub 18 and valve body 14. Likewise, split collar 20 is preferably equipped with an outer circumferential o-ring groove 94 and an o-ring 95 to retain split collar 20 against wedge 87 of valve hub 18 during disassembly.

Figure 7:
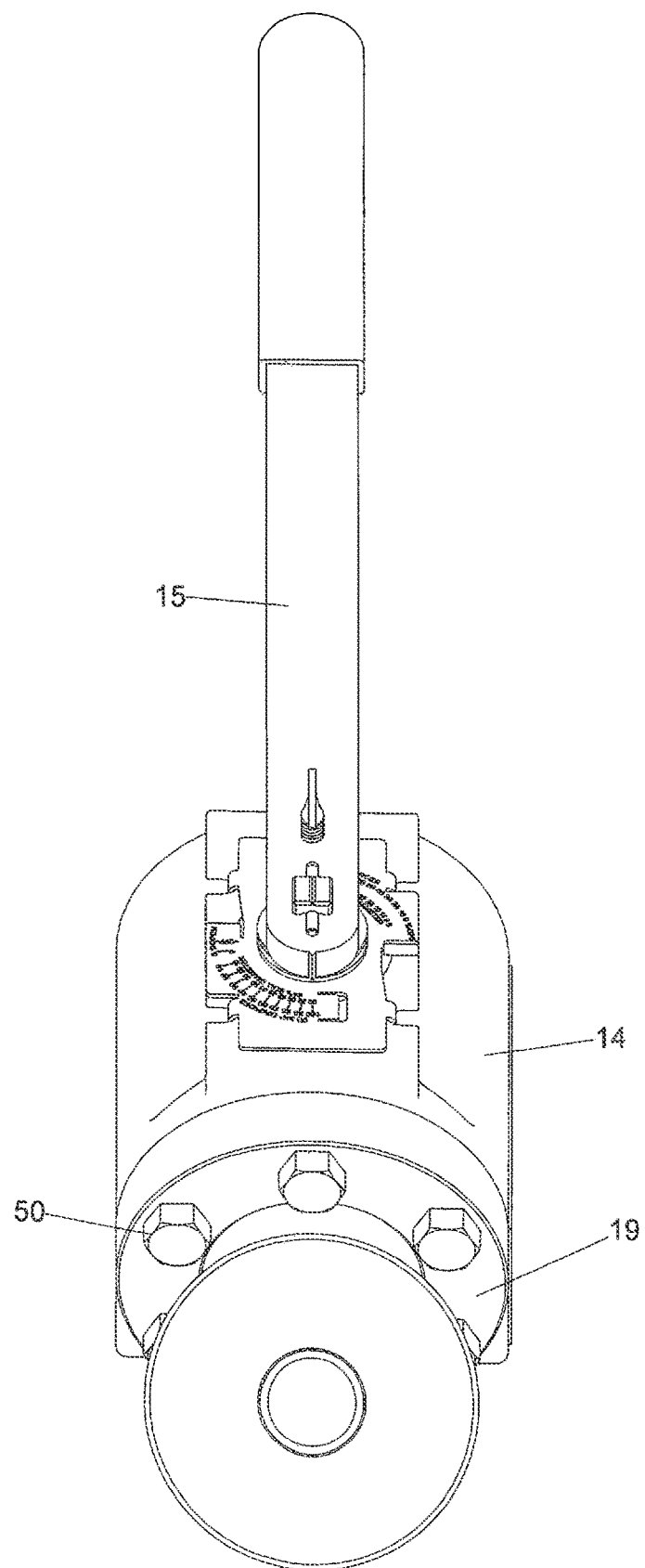
FIG. 7 is a side view of the Y configuration of the fluid throttling valve.
Figure 8:
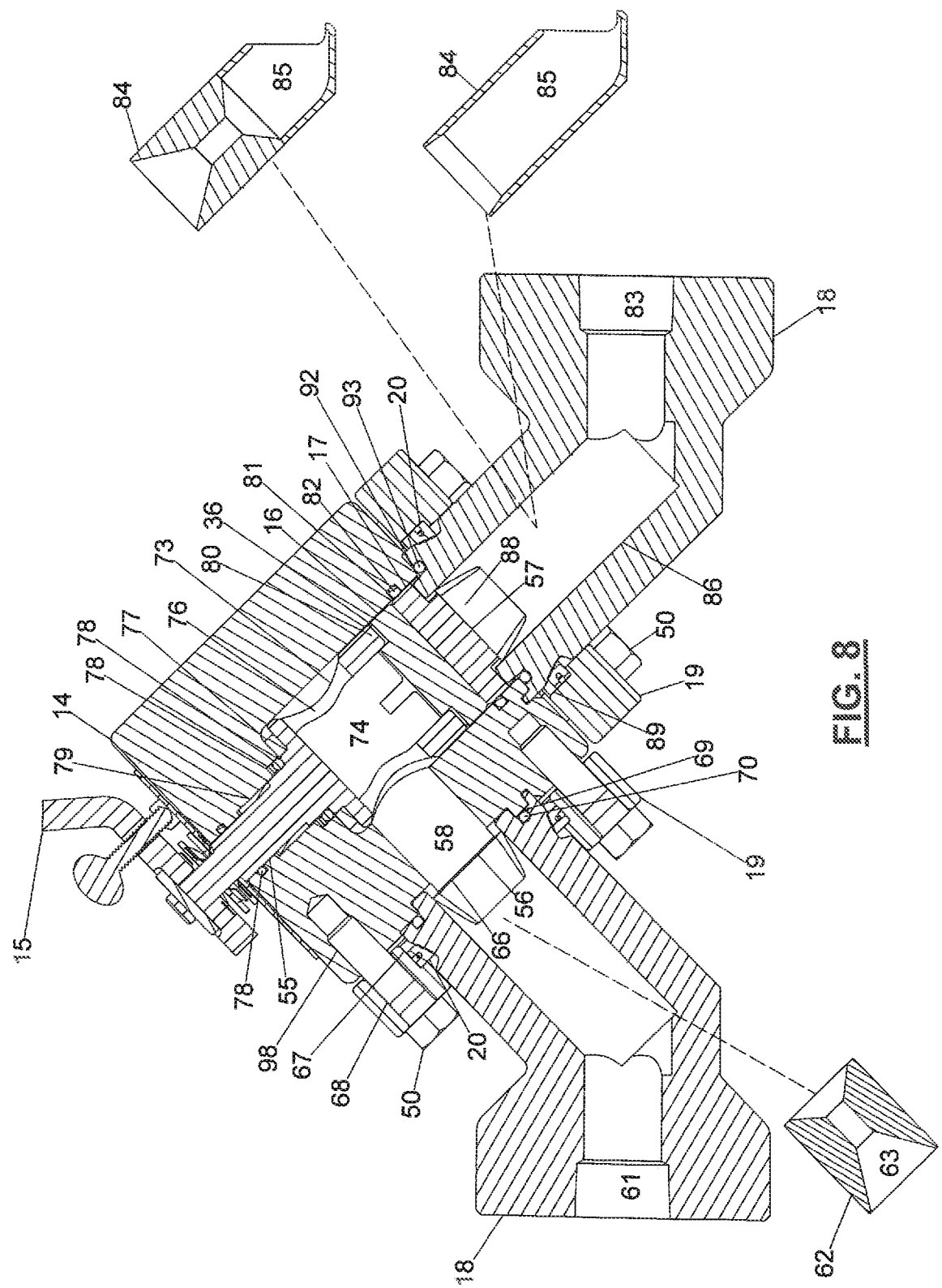
FIG. 8 is a sectional view of the Y configuration of the fluid throttling valve of FIG. 7 taken through line A-A.
Figure 9:
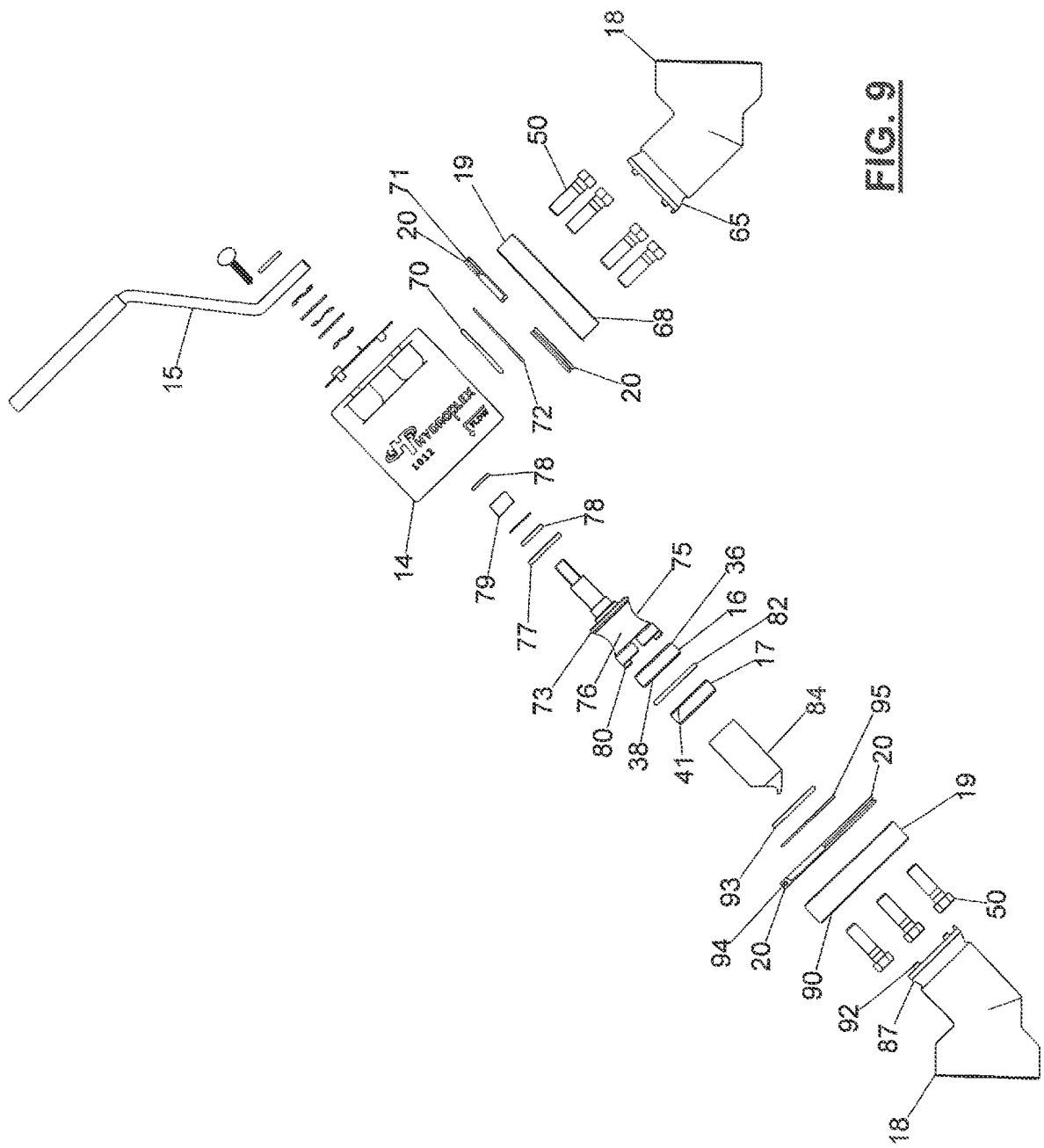
FIG. 9 is an exploded view of the Y configuration of the fluid throttling valve.

As shown in FIGS. 7 through 9, Y configuration 13 of fluid throttling valve 10 has a configuration similar to the 90-degree configuration 12, except that valve hubs 18 next to inlet 96 and outlet 97 both have a 45-degree bend forming an inline configuration between inlet 61 and outlet 83.

As described herein, the throttling valve of the present invention permits installation/placement of multiple orifices both upstream and/or downstream of a main controlling multi-port-disc trim within a single valve body, as desired. As a result, fluid pressure is throttled across said throttling valve in a plurality of smaller drops or "stages" in order to reduce or eliminate cavitation, as well as temperature loss due to the JT effect.

What is claimed is:

1. A method for throttling fluid pressure of a fluid flow stream comprising:
   (a) installing a throttling valve in said flow stream, said throttling valve comprising:
      i) a body having an outer wall, an inner surface, an inlet, an outlet, an axial bore extending from said inlet to said outlet of said body, a slot extending through a portion of said outer wall of said body, an o-ring groove in said inner surface of said body near said outlet of said body, and at least one hole extending axially into said outer wall adjacent to said outlet of said body;
      ii) a valve rotator positioned within said axial bore of said body, said valve rotator having an outer surface, an outer wall, an inlet, an outlet, an upstream o-ring groove on said outer surface of said valve rotator, a downstream o-ring groove on said outer surface of said valve rotator, at least one tab extending axially from said outer wall of said valve rotator adjacent to said outlet of said valve rotator, and an axial bore aligned with said axial bore of said body, said outer wall of said valve rotator having a hole extending from said outer surface of said valve rotator through a portion of said outer wall of said valve rotator, said hole being aligned with said slot of said body when said valve rotator is positioned within said axial bore of said body;
      iii) a handle extending from said hole of said valve rotator through said slot of said body;
      iv) a rotating orifice disk positioned within said axial bore of said body downstream of said valve rotator, said rotating orifice disk having an outer surface, an outer wall, an inlet, an outlet, at least one slot extending axially into said outer wall of said rotating orifice disk adjacent to said inlet of said rotating orifice disk for engaging said at least one tab of said valve rotator, and at least one axial orifice extending through said rotating orifice disk;
      v) a fixed orifice disk positioned within said axial bore of said body downstream of said rotating orifice disk and where said o-ring groove in said inner surface of said body is located, said fixed orifice disk having an outer surface, an outer wall, an inlet, an outlet, at least one slot extending axially into said outer wall of said rotating orifice disk adjacent to said inlet of said rotating orifice disk for engaging said at least one tab of said valve rotator, and at least one axial orifice extending through said fixed orifice disk;
      vi) a hub positioned downstream of said body adjacent to said fixed orifice disk, said hub having an outer surface, an outer wall, an inlet, an outlet, an outer wedge near said inlet of said hub, and an axial bore aligned with said axial bore of said body at least one tab extending axially from said outer wall of said valve rotator;

vii) a hub retainer positioned around said hub adjacent to said outlet of said body, said hub retainer having an outer wall, an inner surface, an inner recessed area, and at least one hole extending axially through said outer wall of said hub retainer for aligning with at least one hole extending axially into said outer wall adjacent to said outlet of said body, wherein said hub retainer is secured to said body;

viii) a hub split collar positioned between said outer wedge near said inlet of said hub and said inner recessed area of said hub retainer, said hub split collar having an outer surface;

b) reducing pressure of said fluid flowing across said throttling valve in a plurality of stages.

2. The method of claim 1, wherein said body, said valve rotator, and said hub are cylindrical, and said body has an inner diameter.

3. The method of claim 2, wherein said at least one axial orifice extending through said rotating orifice disk has a diameter shorter in length than said inner diameter of said body downstream of said valve rotator, wherein said at least one axial orifice extending through said fixed orifice disk has a diameter shorter in length than said inner diameter of said body downstream of said valve rotator, and wherein the rotated position of said axial orifice extending through said rotating orifice disk in relation to the fixed position of said axial orifice extending through said fixed orifice disk controls the flowrate and pressure drop through said valve.

4. The method of claim 3, wherein said throttling valve further comprises:
(a) a first o-ring that fits into said o-ring groove in said inner surface of said body near said outlet of said body;
(b) a second o-ring that fits into said upstream o-ring groove on said outer surface of said valve rotator;
(c) a third o-ring that fits into said downstream o-ring groove on said outer surface of said valve rotator;
(d) an o-ring groove in said outer wall at said inlet of said hub;
(e) a fourth o-ring that fits into said o-ring groove in said outer wall at said inlet of said hub;
(f) an o-ring groove in said outer surface of said hub split collar; and
(g) a fifth o-ring that fits into said o-ring groove in said outer surface of said hub split collar.

5. The method of claim 4, wherein said throttling valve further comprises:
(a) a first back-up ring that fits into said upstream o-ring groove on said outer surface of said valve rotator; and
(b) a second back-up ring that fits into said downstream o-ring groove on said outer surface of said valve rotator.

6. The method of claim 5, wherein said throttling valve further comprises a hub wear sleeve positioned inside of said axial bore of said hub.

7. A method for throttling fluid pressure of a fluid flow stream comprising:
(a) installing a throttling valve in said flow stream, said throttling valve comprising:
(i) a body having an outer wall, an inner surface, an inlet, an outlet, a valve stem opening, an axial bore extending from said inlet to said outlet of said body, an inner chamber that makes a substantially 90-degree turn between said inlet and outlet of said body, an o-ring groove in said inner surface of said body near said outlet of said body, at least one hole extending axially into said outer wall of said body adjacent to said inlet of said body, and at least one hole extending axially into said outer wall of said body adjacent to said outlet of said body;

(ii) a first hub positioned upstream of said body adjacent to said inlet of said body, said first hub having an outer surface, an outer wall, an inlet, an outlet, an outer wedge near said outlet of said first hub, and an axial bore aligned with said inlet of said body at least one tab extending axially from said outer wall of said valve rotator;

(iii) a first hub retainer positioned around said first hub adjacent to said inlet of said body and secured to said body, said first hub retainer having an outer wall, an inner surface, an inner recessed area, and at least one hole extending axially through said outer wall of said first hub retainer for aligning with said at least one hole extending axially into said outer wall of said body adjacent to said inlet of said body;

(iv) a first hub split collar positioned between said outer wedge near said outlet of said first hub and said inner recessed area of said first hub retainer;

(v) a valve stem rotatably disposed within said inner chamber of said body and extending through said valve stem opening of said body, said valve stem having an outer wall, an axial bore aligned with said outlet of said body, a hole extending through said outer wall of said valve stem for aligning with said inlet of said body, an outlet, and at least one tab extending axially from said outer wall of said valve stem adjacent to said outlet of said valve stem;

(vi) a rotating orifice disk positioned within said inner chamber of said body downstream of said valve stem, said rotating orifice disk having an outer surface, an outer wall, an inlet, an outlet, at least one slot extending axially into said outer wall of said rotating orifice disk adjacent to said inlet of said rotating orifice disk for engaging said at least one tab of said valve stem, and at least one axial orifice extending through said rotating orifice disk;

(vii) a fixed orifice disk positioned within said inner chamber of said body downstream of said rotating orifice disk and where said o-ring groove in said inner surface of said body is located, said fixed orifice disk having an outer surface, an outer wall, an inlet, an outlet, and at least one axial orifice extending through said rotating orifice disk;

(viii) a second hub positioned downstream of said body adjacent to said fixed orifice disk, said second hub having an outer surface, an outer wall, an inlet, an outlet, an outer wedge near said inlet of said second hub, and an axial bore aligned with said outlet of said body at least one tab extending axially from said outer wall of said valve rotator, and wherein said second hub is secured to said body;

(ix) a second hub retainer positioned around said second hub adjacent to said outlet of said body, said second hub retainer having an outer wall, an inner surface, an inner recessed area, and at least one hole extending axially through said outer wall of said second hub retainer for aligning with at least one hole extending axially into said outer wall adjacent to said outlet of said body;

(x) a second hub split collar positioned between said outer wedge near said inlet of said second hub and said inner recessed area of said second hub retainer; and b) reducing pressure of said fluid flowing through said throttling valve in a plurality of stages.

8. The method of claim 7, wherein said hubs are cylindrical, and said axial bore of said body downstream of said valve stem has an inner diameter.

9. The method of claim 8, wherein said at least one axial orifice extending through said rotating orifice disk has a diameter shorter in length than said inner diameter of said body, wherein said at least one axial orifice extending through said fixed orifice disk has a diameter shorter in length than said inner diameter of said body, and wherein the rotated position of said axial orifice extending through said rotating orifice disk in relation to the fixed position of said axial orifice extending through said fixed orifice disk controls the flowrate and pressure drop through said valve.

10. The method of claim 9, wherein said throttling valve further comprises:
    (a) a first o-ring that fits into said o-ring groove in said inner surface of said body near said outlet of said body;
    (b) an o-ring groove in said outer wall at said outlet of said first hub;
    (c) a second o-ring that fits into said o-ring groove in said outer wall at said outlet of said first hub;
    (d) an o-ring groove in said outer wall at said inlet of said second hub;
    (e) a third o-ring that fits into said o-ring groove in said outer wall at said inlet of said second hub;
    (f) an o-ring groove in said outer surface of said first hub split collar;
    (g) a fourth o-ring that fits into said o-ring groove in said outer surface of said first hub split collar;
    (h) an o-ring groove in said outer surface of said second hub split collar; and
    (i) a fifth o-ring that fits into said o-ring groove in said outer surface of said second hub split collar.

11. The method of claim 10, wherein said throttling valve further comprises at least one hub wear sleeves positioned inside of said axial bores of said second hub.

* * * * *